(12) United States Patent
Xia

(10) Patent No.: US 7,636,900 B2
(45) Date of Patent: Dec. 22, 2009

(54) PERSONALIZED VIRTUAL REALITY HOME SCREEN FOR MOBILE DEVICES

(75) Inventor: Bing Xia, Fremont, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 273 days.

(21) Appl. No.: 11/552,767

(22) Filed: Oct. 25, 2006

(65) Prior Publication Data

US 2008/0104018 A1    May 1, 2008

(51) Int. Cl.
*G06F 13/00*   (2006.01)
*G06F 15/00*   (2006.01)
(52) U.S. Cl. ...................... 715/850; 715/706
(58) Field of Classification Search ......... 715/705–709, 715/751, 826, 764, 736–740, 757–759, 727–730, 715/850; 345/757, 760
See application file for complete search history.

(56) References Cited

U.S. PATENT DOCUMENTS

| 6,166,732 | A  | * | 12/2000 | Mitchell et al. | ............. | 715/733 |
| 6,964,022 | B2 | * | 11/2005 | Snowdon et al. | ............. | 715/759 |
| 2002/0186244 | A1 | * | 12/2002 | Matsuda et al. | ............. | 345/757 |
| 2007/0047782 | A1 | * | 3/2007 | Hull et al. | ................... | 382/124 |

* cited by examiner

*Primary Examiner*—Kevin Nguyen

(57) ABSTRACT

A system comprising a display, a processor, and a storage device is provided. The storage device is operable to store instructions that, when executed by the processor, display on the display as a home screen a portion of a virtual world. The virtual world includes a plurality of objects sharing a common theme. At least one of the plurality of objects is operable to launch an application and at least one of the plurality of objects is operable to provide notification of an event to a user of the system.

19 Claims, 4 Drawing Sheets

Fig. 4
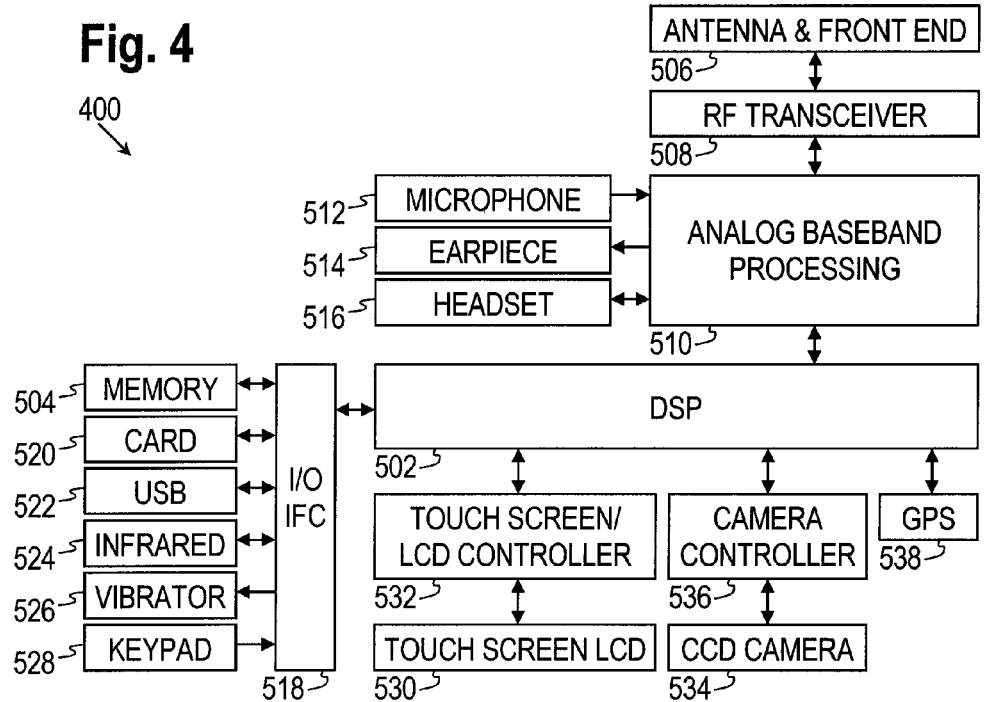
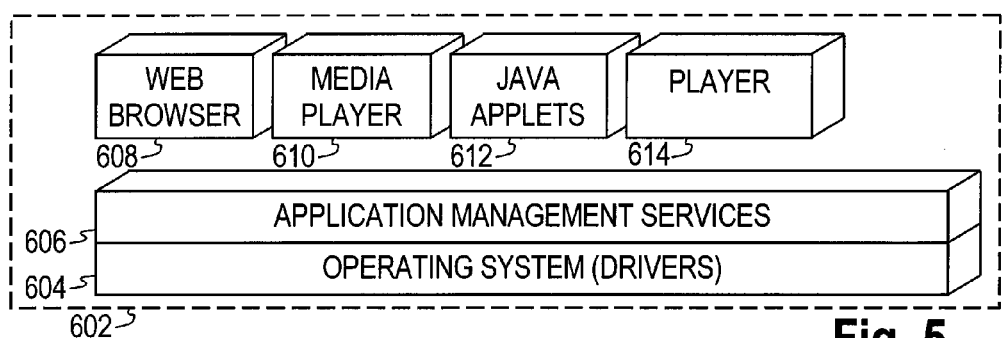
Fig. 5

PERSONALIZED VIRTUAL REALITY HOME SCREEN FOR MOBILE DEVICES

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Handheld electronic devices such as mobile telephones, personal digital assistants, handheld computers, and similar devices will be referred to herein as handsets. Handsets typically have a menu system that allows users to launch applications, adjust settings, access data, retrieve messages, and perform other functions. Navigation through a menu system might be carried out by pressing navigation keys on a handset keypad or by manipulating other input devices typically associated with a handset. Since handsets typically have small display screens compared to the display screens typically used with desktop and laptop computer systems, a large menu system that might easily fit on a computer screen might not fit on a handset screen at a resolution that can easily be read.

SUMMARY

In one embodiment, a system comprising a display, a processor, and a storage device is provided. The storage device is operable to store instructions that, when executed by the processor, display on the display as a home screen a portion of a virtual world. The virtual world includes a plurality of objects sharing a common theme. At least one of the plurality of objects is operable to launch an application and at least one of the plurality of objects is operable to provide notification of an event to a user of the system.

In another embodiment, a mobile handset comprising a processor, a storage device, a display, and instructions is provided. The instructions, when executed by the processor, display on the display as a home screen a portion of a virtual world. The virtual world includes a plurality of objects with a three-dimensional appearance and with a common theme. At least one of the plurality of objects is operable to launch an application and at least one of the plurality of objects is operable to provide notification of an event to a user of the system.

In another embodiment, a computer readable medium is provided. The computer readable medium includes instructions that, when processed by a processor, promote displaying a graphical user interface to a display. The graphical user interface includes a portion of a virtual world that includes a plurality of objects with a three-dimensional appearance. The plurality of objects share a common theme. At least one of the plurality of objects is operable to launch an application and at least one of the plurality of objects is operable to move about in the virtual world and provide message notification.

These and other features and advantages will be more clearly understood from the following detailed description taken in conjunction with the accompanying drawings and claims.

BRIEF DESCRIPTION OF THE DRAWINGS

For a more complete understanding of the disclosure and the advantages thereof, reference is now made to the following brief description, taken in connection with the accompanying drawings and detailed description, wherein like reference numerals represent like parts.

FIG. 4 is a block diagram of a handset operable for some of the various embodiments of the disclosure.

FIG. 5 is a diagram of a software environment that may be implemented on a handset operable for some of the various embodiments of the disclosure.

DETAILED DESCRIPTION

Figure 1:
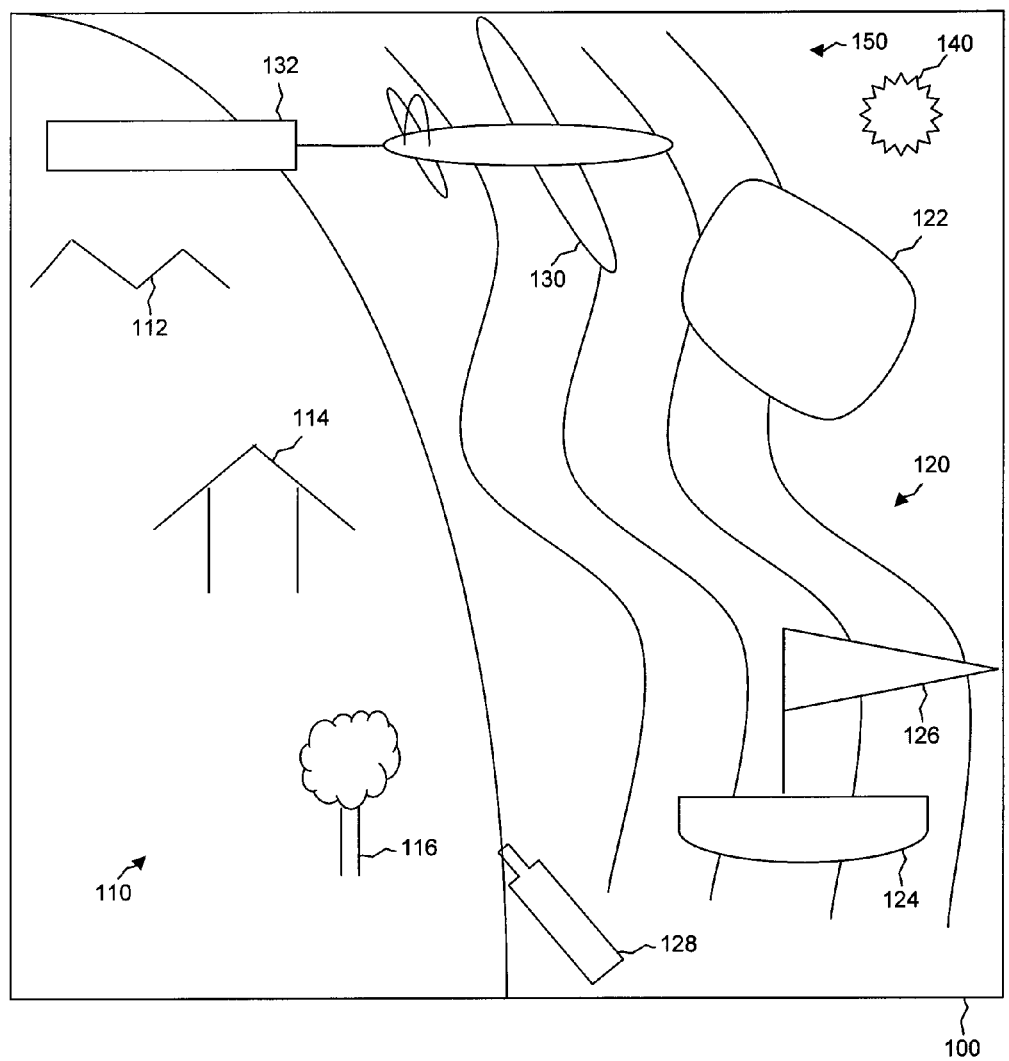
FIG. 1 illustrates a portion of a virtual world for a handset according to an embodiment of the disclosure.

It should be understood at the outset that although an illustrative implementation of one embodiment of the disclosure is illustrated below, the system may be implemented using any number of techniques, whether currently known or in existence. The disclosure should in no way be limited to the illustrative implementations, drawings, and techniques illustrated below, including the exemplary design and implementation illustrated and described herein, but may be modified within the scope of the appended claims along with their full scope of equivalents.

The physical components that allow the display of images on a handset will be referred to herein as a display and will be described hereinafter. The image that appears on the display when a handset is initially turned on can be referred to as the home screen or the idle screen. The home screen is typically a graphical user interface through which a user can navigate and which allows the entry and display of data. The home screen typically displays a portion of the menu system that is used to access the functions of the handset and might also display icons, message alerts, and other information.

In embodiments of the disclosure, a home screen of a handset displays a 'virtual world' containing a plurality of objects that share a common theme. That is, a substantial portion of the objects appear to intrinsically belong in the scene depicted in the virtual world. For example, if the virtual world depicted a beach scene, the objects in the virtual world might include a beach, an ocean, a boat, an island, and other items that might logically belong in or fit into a beach-related theme. If the virtual world depicted a city scene, the objects in the virtual world might include buildings, streets, cars, and other items that might belong in a city-related theme. The virtual world might depict a real location, such as Waikiki Beach or New York City, or might depict a fictional but readily identifiable location, such as a generic beach or a generic city.

At least some of the objects in the virtual world are able to move about in the virtual world. For example, in a beach scene, a boat might appear to move across the water. In a city scene, a car might appear to move along a street. In either type of scene, an airplane or the sun might appear to move through the sky. In other scenes, other types of motion might be possible.

The objects in the virtual world might allow actions to be performed on the handset. For example, an object may act as a shortcut to a handset application, whereby selection of the object launches the application. Alternatively, selection of an object might cause a menu to be displayed, might allow settings to be adjusted, or might allow a user to perform other functions that are typically performed when traditional menu items are selected. In addition, an object might provide the user of the handset with information such as alerts, news updates, or weather information. For example, the movement of an object through the virtual world might indicate that a message has arrived or the movement of the sun through the sky might indicate the passage of time. Information might also be conveyed by a previously invisible object becoming visible or by an object changing its appearance or in other ways.

Only a portion of the virtual world may be visible on the home screen at any time. A handset user can use the navigation keys or other input mechanisms on the handset to pan through the home screen and bring other portions of the virtual world into view. For example, the user might pan left, right, up, or down through the home screen to reveal other objects that are present in the virtual world but cannot currently be seen.

The objects that appear in the virtual world might be provided with scaling, shadowing, and other well-known effects that can give a three-dimensional appearance to the objects and to the virtual world in which the objects appear. That is, each object can be made to appear to have depth rather than being two-dimensional and some objects might appear to be closer to the user than other objects. Navigation keys or other input mechanisms on the handset might be used to create an appearance of moving into and out of the virtual world so that objects at different apparent depths can be approached or selected.

FIG. 1 illustrates an embodiment of a virtual world 100 that might appear as a home screen on a display of a handset. In this example, a beach scene is depicted in which a plurality of beach-related objects are present, including a beach 110 and a body of water 120. A plurality of natural objects, such as a mountain 112 and a tree 116, might appear on the beach 110. The beach 110 might also include a plurality of man-made objects such as a building 114. A plurality of natural objects, such as an island 122, and a plurality of man-made objects, such as a boat 124, might appear on the water 120. An airplane 130, the sun 140, and other objects might appear in the sky 150 of the virtual world 100.

A user can navigate through the virtual world 100 and cause different portions of the virtual world 100 and different objects to be displayed on the home screen of the user's handset. For example, a user might pan downward or to the left to see more of the beach 110 and more objects that might appear on the beach 110. A user might pan upward, downward, or to the right to see more of the water 120 and more objects that might appear on the water 120. A user might also zoom in and out to cause objects to appear nearer or farther. Zooming in might cause previously invisible objects or properties of objects to come into view.

By selecting objects in the virtual world 100, a user can cause various actions to occur. For example, the mountain 112 or some other object might be a shortcut to an application such as a game, an address book, a calendar, an email program, personal information management, business applications, or some other common handset application. Using the handset navigation keys or another input mechanism to select the mountain 112 might launch the application associated with the mountain 112. Selection of the building 114 or some other object might, for example, cause a screen to be displayed that allows the settings of the handset, such as ring tones or other preferences, to be adjusted.

In addition, a plurality of applications might be associated with a single object. Selecting such an object, the tree 116 for example, might cause a menu of shortcuts to the applications or some other type of display of options to appear in or on the virtual world 100. The user might then select one of the shortcuts or options.

Alternatively or additionally, a plurality of shortcuts and/or options related to a plurality of applications might be visible in or on one of the objects before the object is selected. For example, a plurality of shortcuts might appear as a plurality of fruits on the tree 116. The user might be allowed to directly select one of these shortcuts instead of first selecting the tree 116. The user might be able to zoom in to the tree 116 to view the shortcuts more closely or to bring additional shortcuts into view.

Selection of another object might give the user the appearance of moving to that object. For example, selection of the island 122 might cause the user to appear to fly over the water 120 and land on the island 122. The island 122 might then expand and become another virtual world. That is, island-related objects not previously visible in the beach scene might appear to be present on the island 122. Selection of an object on the island 122 might cause any of the actions described in relation to the beach scene to occur.

The objects in the virtual world 100 might alert the handset user about events for which the user wishes to be notified. For example, movement of the airplane 130 or the boat 124 within the virtual world 100 might be an indication that a message, a time for an appointment, a news update, or some other type of information has arrived. The airplane 130 might carry a banner 132 or the boat 124 might have a sail 126 or flag that contains text or some other type of indication of the content of the information that has arrived. For example, the sail 126 or the banner 132 might display the sender and/or subject of an email or might display the name of a person with whom an appointment was made when the time for the appointment arrives.

Other types of information could be conveyed by other types of movements or changes in the virtual world 100. For example, the position of the sun 140 or the hands of a clock might indicate the time of day. The current weather conditions at the user's location might be indicated by the weather depicted in the virtual world 100 and the virtual world's weather might change as the local weather changes. For example, if rain is falling at the user's location, rain might appear to fall in the virtual world 100.

Alternatively or additionally, a previously invisible object might become visible or a previously visible object might change its appearance to act as a notification that an event has occurred. For example, a bottle 128 depicting a message in a bottle could appear to wash up on the shore of the beach 110 to indicate that an email, a text message, or some other type of message has arrived. Or, an object might flash, change color, rotate, or otherwise change to indicate that an event has occurred. Selecting the object that appears or changes its appearance might retrieve a message or perform some other action related to the notification. Other types of information that could be signaled or represented by movements or changes in the appearance of the virtual world 100 will be apparent to one of skill in the art.

Figure 2:
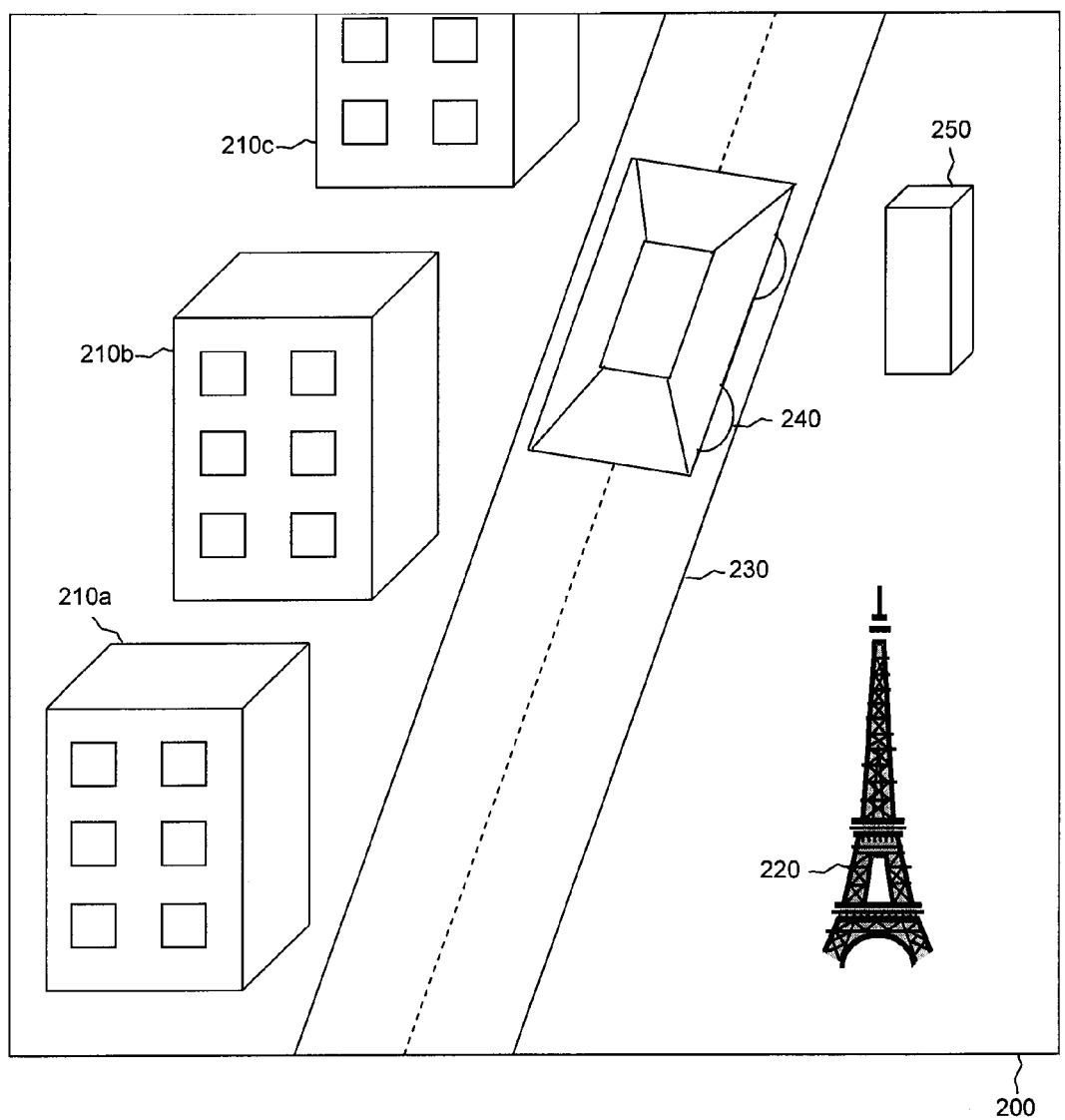
FIG. 2 illustrates a portion of another virtual world for a handset according to an embodiment of the disclosure.

FIG. 2 illustrates an embodiment of another virtual world 200 that might appear as a home screen on the display of a handset. In this example, a city scene is depicted in which a plurality of city-related objects are present, including a plurality of buildings 210, a landmark 220, a street 230, and an automobile 240. As with the beach-based scene, selection of an object in the city scene can cause various actions to occur.

For example, selection of building 210a might launch a first application and selection of building 210b might launch a second application. Alternatively, selection of building 210a or some other object might cause the appearance of a menu or of another object, either of which might allow other actions to be taken. In another alternative, selection of one of the buildings 210 might cause the user to appear to enter the building 210. The user might then be able to navigate through the rooms of the building 210, each of which might allow the user to take actions or might provide information to the user.

Also, as with the example of the beach scene virtual world 100, movements or changes in the city scene virtual world 200 can provide notification of an event to a user. For example, movement of the automobile 240 along the street 230 might be a signal that a message has arrived. Alternatively, sounds might be used to indicate the arrival of a message or the occurrence of some other event. For example, the sound of the automobile 240 blowing its horn or the sound of the driver of the automobile 240 shouting a message might indicate that an email has been received. Also, the number of automobiles 240 on the street 230 might be indicative of actual traffic conditions.

One of skill in the art will recognize that many other virtual world scenes containing many other types of objects could be used in a similar manner. Also, the virtual worlds need not necessarily represent real scenes. For example, readily identifiable or well-known scenes from movies (such as Star Wars®), television programs (such as Star Trek®), games, books, or other media could be depicted. Alternatively, a fantasy scene that exists only in the mind of the creator of a virtual world could be depicted. Also, it should be understood that the beach scene virtual world 100 and the city scene virtual world 200 were illustrated in a very crude fashion in FIGS. 1 and 2. In actual use, it is anticipated that the virtual worlds would have a high-quality appearance so that the user would have the impression of viewing a realistic scene.

In an embodiment, a handset that is capable of displaying a virtual world as a home screen as described herein may include a virtual world player component that enables the display and operation of the virtual worlds. The same player can be installed in multiple different handsets and can be capable of displaying multiple different virtual worlds. In one embodiment, multiple virtual worlds can be stored in the memory of a handset and the user can select which virtual world the player will display at a given time. Alternatively, only one virtual world at a time might be stored. If the user wishes to change virtual worlds, the user might download or otherwise acquire a different virtual world, install the new virtual world on the handset, and have the player display the new virtual world.

Once a virtual world has been selected and/or installed, the user may be given the capability to customize the virtual world by selecting which objects will perform which actions. For example, returning to FIG. 1, the user might select whether the airplane 132, the boat 124, or the message in a bottle 128 will appear in the virtual world 100 to indicate that a new message has arrived or that some other event has occurred. Alternatively, the user might select a sound to indicate the arrival of new information. Also, the user might be allowed to create objects to insert into a virtual world and might be able to assign actions to the created objects.

The user might also select which objects will be used as application shortcuts and might use mnemonic devices to remember the selections. For example, in FIG. 2, a photograph viewing application might be associated with the landmark 220 and an address book application might be associated with a telephone booth 250. The user might elect to associate a group of related application shortcuts under a single object so that, when the object is selected, a list or other display of the shortcuts appears. The user might also be able to associate an icon and/or text with an object as an aid to remembering the function of the object.

The user might also be able to customize the weather that appears in a virtual world. For example, the weather shown in a virtual world might depict weather events that are actually occurring at the user's current location. Alternatively, the user might choose to have the virtual world depict the weather in a different location or to have the virtual world weather be unrelated to any real weather. Other types of customization for a virtual world will be apparent to one of skill in the art.

While the discussion herein has focused on the display of virtual worlds on handsets, it should be understood that similar considerations could apply to other devices. For example, virtual world players could also be installed on desktop computers, laptop computers, and other devices with displays so that the devices could display virtual worlds that function as described herein.

Figure 3:
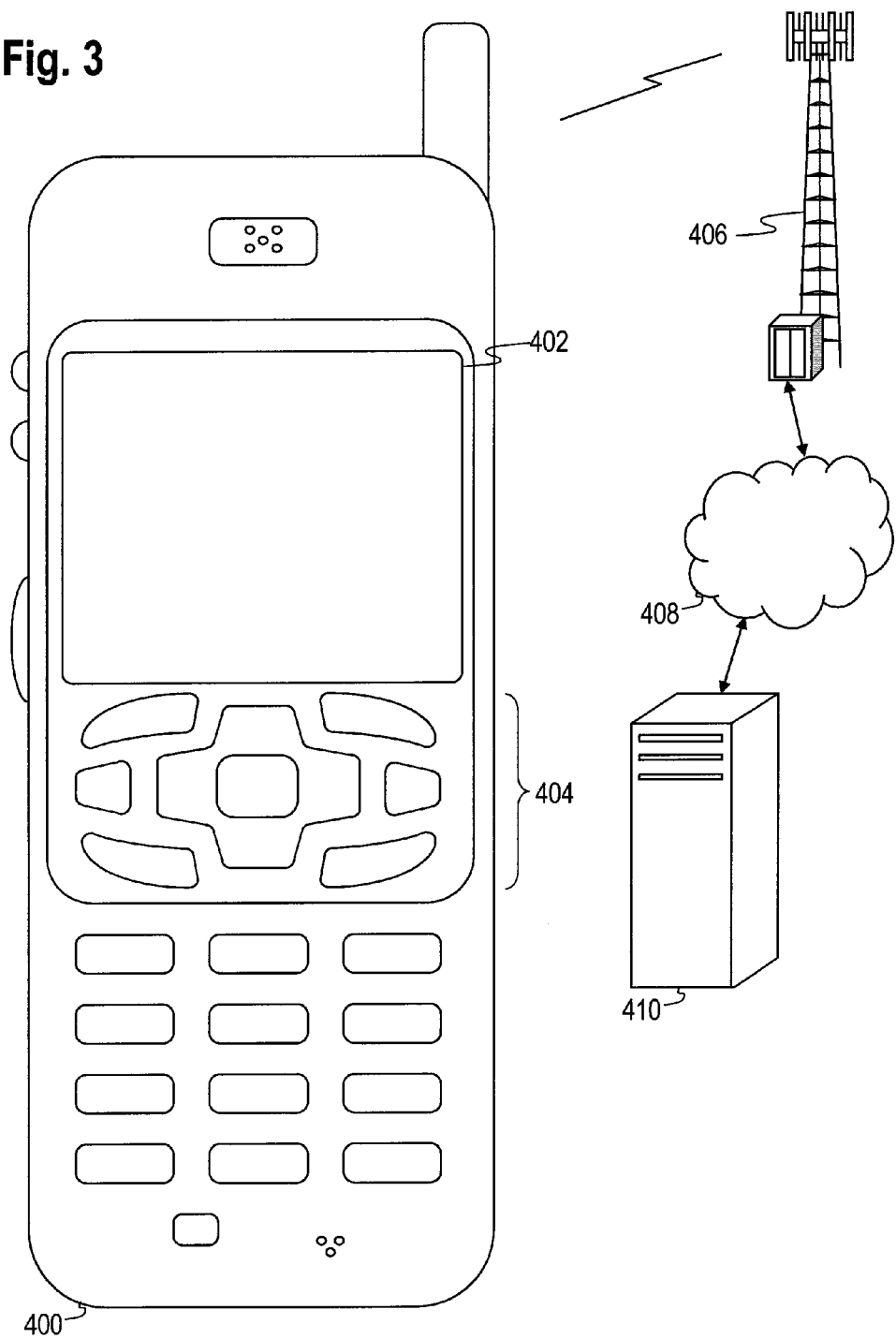
FIG. 3 is a diagram of a wireless communications system including a handset operable for some of the various embodiments of the disclosure.

FIG. 3 shows a wireless communications system including a handset 400. The handset 400 is operable for implementing aspects of the disclosure, such as displaying a virtual world as a home screen, but the disclosure should not be limited to these implementations. Though illustrated as a mobile phone, the handset 400 may take various forms including a wireless handset, a pager, a personal digital assistant (PDA), a portable computer, a tablet computer, or a laptop computer. Many suitable handsets combine some or all of these functions. In some embodiments of the disclosure, the handset 400 is not a general purpose computing device like a portable, laptop or tablet computer, but rather is a special-purpose communications device such as a mobile phone, wireless handset, pager, or PDA.

The handset 400 includes a display 402 and a touch-sensitive surface or keys 404 for input by a user. The handset 400 may present options for the user to select, controls for the user to actuate, and/or cursors or other indicators for the user to direct. The handset 400 may further accept data entry from the user, including numbers to dial or various parameter values for configuring the operation of the handset 400. The handset 400 may further execute one or more software or firmware applications in response to user commands. These applications may configure the handset 400 to perform various customized functions in response to user interaction.

Among the various applications executable by the handset 400 are a web browser, which enables the display 402 to show a web page. The web page is obtained via wireless communications with a cell tower 406, a wireless network access node, or any other wireless communication network or system. The cell tower 406 (or wireless network access node) is coupled to a wired network 408, such as the Internet. Via the wireless link and the wired network, the handset 400 has access to information on various servers, such as a server 410. The server 410 may provide content that may be shown on the display 402.

FIG. 4 shows a block diagram of the handset 400. The handset 400 includes a digital signal processor (DSP) 502 and a memory 504. As shown, the handset 400 may further include an antenna and front end unit 506, a radio frequency (RF) transceiver 508, an analog baseband processing unit 510, a microphone 512, an earpiece speaker 514, a headset port 516, an input/output interface 518, a removable memory card 520, a universal serial bus (USB) port 522, an infrared port 524, a vibrator 526, a keypad 528, a touch screen liquid crystal display (LCD) with a touch sensitive surface 530, a touch screen/LCD controller 532, a charge-coupled device (CCD) camera 534, a camera controller 536, and a global positioning system (GPS) sensor 538.

The DSP 502 or some other form of controller or central processing unit operates to control the various components of the handset 400 in accordance with embedded software or firmware stored in memory 504. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The antenna and front end unit 506 may be provided to convert between wireless signals and electrical signals, enabling the handset 400 to send and receive information from a cellular network or some other available wireless communications network. The RF transceiver 508 provides frequency shifting, converting received RF signals to baseband and converting baseband transmit signals to RF. The analog baseband processing unit 510 may provide channel equalization and signal demodulation to extract information from received signals, may modulate information to create transmit signals, and may provide analog filtering for audio signals. To that end, the analog baseband processing unit 510 may have ports for connecting to the built-in microphone 512 and the earpiece speaker 514 that enable the handset 400 to be used as a cell phone. The analog baseband processing unit 510 may further include a port for connecting to a headset or other hands-free microphone and speaker configuration.

The DSP 502 may send and receive digital communications with a wireless network via the analog baseband processing unit 510. In some embodiments, these digital communications may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB interface 522 and the infrared port 524. The USB interface 522 may enable the handset 400 to function as a peripheral device to exchange information with a personal computer or other computer system. The infrared port 524 and other optional ports such as a Bluetooth interface or an IEEE 802.11 compliant wireless interface may enable the handset 400 to communicate wirelessly with other nearby handsets and/or wireless base stations.

The input/output interface 518 may further connect the DSP 502 to the vibrator 526 that, when triggered, causes the handset 400 to vibrate. The vibrator 526 may serve as a mechanism for silently alerting the user to any of various events such as an incoming call, a new text message, and an appointment reminder.

The keypad 528 couples to the DSP 502 via the interface 518 to provide one mechanism for the user to make selections, enter information, and otherwise provide input to the handset 400. Another input mechanism may be the touch screen LCD 530, which may also display text and/or graphics to the user. The touch screen LCD controller 532 couples the DSP 502 to the touch screen LCD 530.

The CCD camera 534 enables the handset 400 to take digital pictures. The DSP 502 communicates with the CCD camera 534 via the camera controller 536. The GPS sensor 538 is coupled to the DSP 502 to decode global positioning system signals, thereby enabling the handset 400 to determine its position. Various other peripherals may also be included to provide additional functions, e.g., radio and television reception.

FIG. 5 illustrates a software environment 602 that may be implemented by the DSP 502. The DSP 502 executes operating system drivers 604 that provide a platform from which the rest of the software operates. The operating system drivers 604 provide drivers for the handset hardware with standardized interfaces that are accessible to application software. The operating system drivers 604 include application management services ("AMS") 606 that transfer control between applications running on the handset 400. Also shown in FIG. 5 are a web browser application 608, a media player application 610, and Java applets 612. The web browser application 608 configures the handset 400 to operate as a web browser, allowing a user to enter information into forms and select links to retrieve and view web pages. The media player application 610 configures the handset 400 to retrieve and play audio or audiovisual media. The Java applets 612 configure the handset 400 to provide games, utilities, and other functionality. A virtual world player 614 might display virtual worlds as described herein. Alternatively, the player might be embodied in hardware, firmware, or some other medium or combination of media.

While several embodiments have been provided in the disclosure, it should be understood that the disclosed systems and methods may be embodied in many other specific forms without departing from the spirit or scope of the disclosure. The examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the disclosure. Other items shown or discussed as directly coupled or communicating with each other may be coupled through some interface or device, such that the items may no longer be considered directly coupled to each other but may still be indirectly coupled and in communication, whether electrically, mechanically, or otherwise with one another. Other examples of changes, substitutions, and alterations are ascertainable by one skilled in the art and could be made without departing from the spirit and scope disclosed herein.

What is claimed is:

1. A wireless communication system, comprising
a mobile device having a display;
a processor; and
a storage device operable to store instructions that, when executed by the processor, display on the display as a home screen at least a first portion of a virtual world including a plurality of objects sharing a common theme, at least one of the plurality of objects operable to launch an application and at least one of the plurality of objects operable to provide notification of an event to a user of the system,
wherein the user operably selects one of the objects operable to launch an application and one of the objects operable to provide notification,
wherein a user can zoom in on a zoomable object in the virtual world, and wherein zooming in on the zoomable object causes a previously invisible object to appear, the previously invisible object operable to be selected by the user.

2. The system of claim 1, wherein the notification of the event is provided by at least one of:
   a movement of at least one of the objects on the display;
   at least one of the objects becoming visible on the display;
   a change in an appearance of at least one of the objects; and
   a sound related to the theme.

3. The system of claim 1, wherein the application is at least one of:
   a game;
   an address book;
   a calendar;
   an email program;
   a system setting;
   personal information management; and
   business applications.

4. The system of claim 1, wherein the objects have a substantially three-dimensional appearance.

5. The system of claim 1, wherein the virtual world is navigable such that user input promotes the display of a second portion of the virtual world not previously visible on the display, and further wherein user input operably promotes zooming in and out of the virtual world, and further promotes the selection of one of the objects.

6. The system of claim 5, wherein the selection of one of the objects makes visible on the display a plurality of options related to a plurality of applications.

7. The system of claim 5, wherein the selection of one of the objects causes the display of a second virtual world related to the selected object.

8. The system of claim 1, wherein a weather event that appears in the virtual world corresponds to a weather event in the real world.

9. The system of claim 1, wherein the processor is further operable to process instructions related to a player component operable for displaying a different virtual world.

10. The system of claim 1, wherein the system is further defined as at least one of:
    a mobile wireless telecommunications handset;
    a personal digital assistant;
    a handheld computer;
    a personal computer;
    a laptop computer; and
    a tablet computer.

11. The system of claim 1, wherein the event is one of a message, a time for an appointment, and a news update.

12. The system of claim 1, wherein the number of objects displayed in at least the first portion of the virtual world indicates traffic conditions at a location in the real world.

13. A mobile handset, comprising:
    a processor;
    a display; and
    instructions that, when executed by the processor, display on the display as a home screen a first portion of a virtual world including a plurality of objects with a three-dimensional appearance, the plurality of objects sharing a common theme, and at least one of the plurality of objects operable to launch an application, and at least one of the plurality of objects operable to provide notification of an event to a user of the mobile handset,
    wherein the virtual world is freely navigable such that user input promotes the display of a second portion of the virtual world not previously visible on the display, wherein a user can zoom in on a zoomable object in the virtual world, and wherein zooming in on the zoomable object causes a previously invisible object to appear, the previously invisible object operable to be selected by the user.

14. The mobile handset of claim 13, wherein the notification of the event is provided by at least one of:
    a movement of at least one of the objects on the display;
    at least one of the objects becoming visible on the display;
    a change in an appearance of at least one of the objects; and
    a sound related to the theme.

15. The mobile handset of claim 13, wherein the application is at least one of:
    a game;
    an address book;
    a calendar;
    an email program; and
    a system setting.

16. The mobile handset of claim 15, wherein the selection of one of the objects makes visible on the display a plurality of options related to a plurality of applications.

17. A computer readable medium including instructions that when processed by a processor promote displaying to a display a graphical user interface, comprising:
    a first portion of a virtual world including a plurality of objects with a three-dimensional appearance, the plurality of objects sharing a common theme, and at least one of the plurality of objects operable to launch an application, and at least one of the plurality of objects operable to move about in the virtual world and provide message notification,
    wherein the selection of one of the objects makes visible on the display a plurality of options related to a plurality of applications,
    wherein a user can zoom in on a zoomable object in the virtual world, and wherein zooming in on the zoomable object causes a previously invisible object to appear, the previously invisible object operable to be selected by the user.

18. The computer readable medium of claim 17, wherein the application is at least one of:
    a game;
    an address book;
    a calendar;
    an email program; and
    a system setting.

19. The computer readable medium of claim 17, wherein the virtual world is navigable such that user input promotes the display of a second portion of the virtual world not previously visible on the display, and further wherein user input operably promotes zooming in and out of the virtual world, and further promotes the selection of one of the objects.

* * * * *